INVENTOR.
Paul E. Hanser
BY Bush & Buch
His Attorneys

July 16, 1968 P. E. HANSER 3,392,661
FOOD PROCESSOR
Filed July 25, 1966 6 Sheets-Sheet 3

Paul E. Hanser INVENTOR.
BY Bush & Bush
His Attorneys.

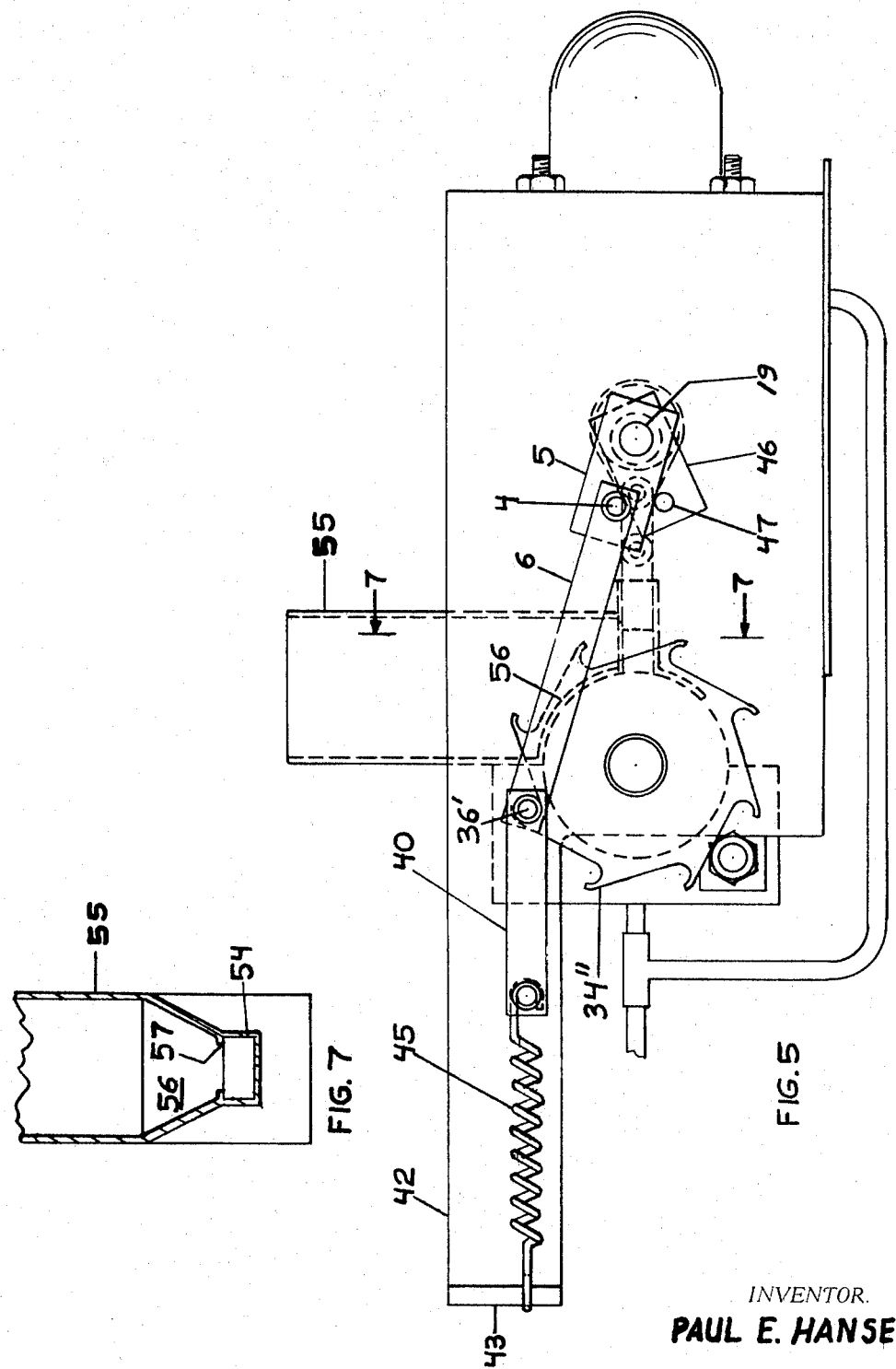

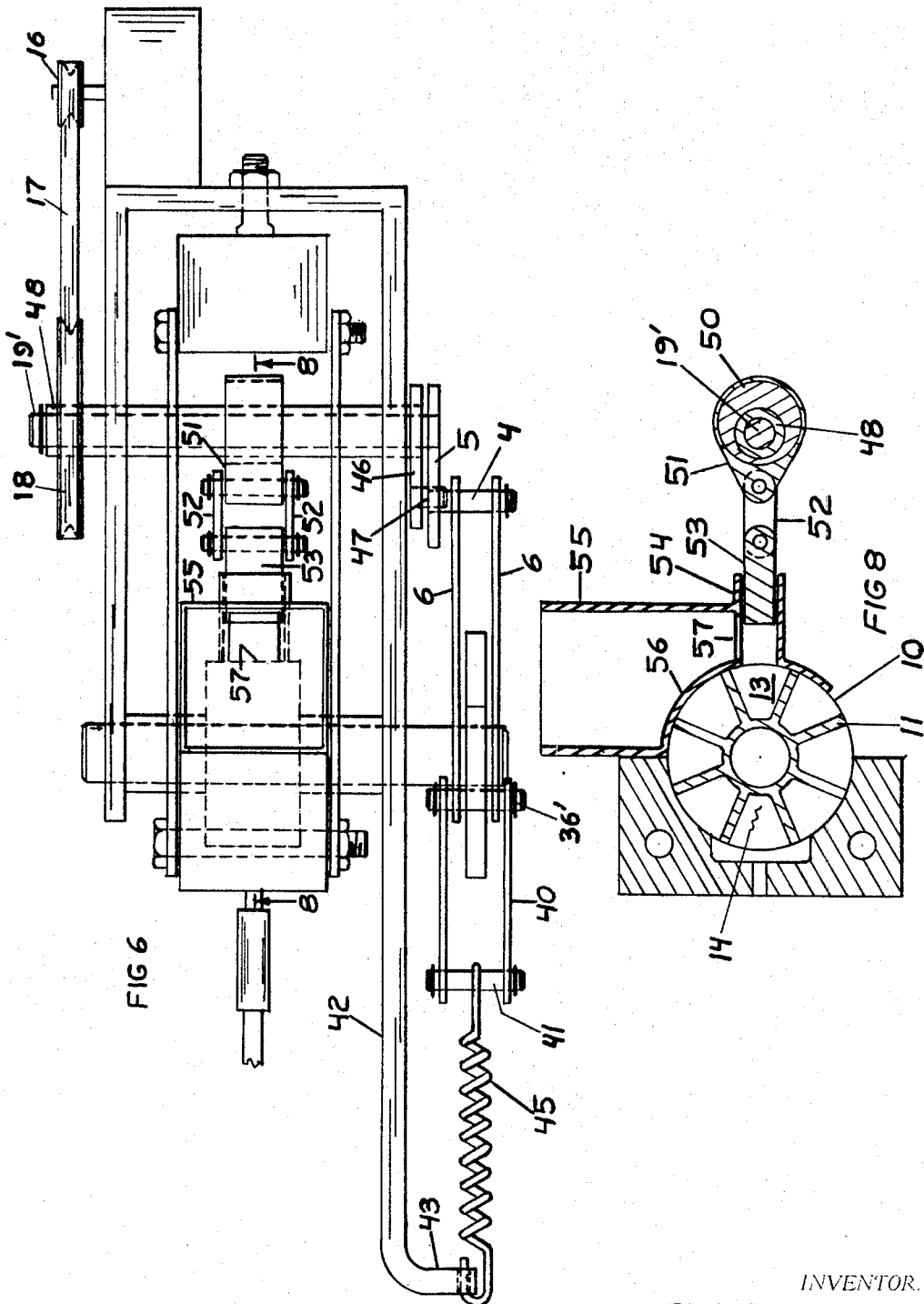

United States Patent Office 3,392,661
Patented July 16, 1968

3,392,661
FOOD PROCESSOR
Paul E. Hanser, 2329 33rd St., Moline, Ill. 61265
Continuation-in-part of application Ser. No. 259,216,
Feb. 18, 1963. This application July 25, 1966, Ser.
No. 593,226
21 Claims. (Cl. 99—238)

ABSTRACT OF THE DISCLOSURE

A food processing machine including a main frame; structure on the frame defining an inlet and outlet; a rotary mechanism with angularly spaced outwardly opening chambers moving between the inlet and outlet; a chamber closure device between the inlet and outlet alongside the rotary device and supported on the frame for radial movement in respect to the rotary device; a fluid pressure means opening into the chambers tending to separate the two devices; and an external force transmitting means operating to close the devices and to counterbalance the effect of the fluid pressure against the closure device.

---

This is a continuation in part of U.S. patent application Ser. No. 259,216 filed Feb. 18, 1963 and now abandoned.

This invention relates to an improved grain puffing machine and more particularly to a grain puffing machine that utilizes high pressure steam to puff the grain.

It is a primary object of the invention to provide an improved, effective, simple and economical machine which at adjusted short intervals of time will feed batches of raw grain such as wheat, rice, corn, barley and other cereals, from a sloping bin or hopper into successive expanding radial chambers or pockets of a circular rotor and in which the grain is subjected to hot vaporized steam pressure during intermittent partial revolutions and short stoppages of the rotor and then released and discharged in the form of large puffed cereal from the bottom of the rotor. The above is provided in combination with adjustable means to subject the cereal in the radial pressure chambers of the rotor to the penetrative action of hot steam vapors for various predetermined periods and release it at a certain point.

It is a further object of the invention to provide adjustable sealing means to automatically prevent leakage of steam and hot vapor, and to balance the pressure upon the front and rear edges of the rotor and the sealing means contacted thereby and to take up wear if needed.

It is a further object of the invention to provide at the base of the hopper a plunger mechanism that operates to discharge a predetermined quantity of untreated material into the respective chambers or pockets to insure that an exact quantity of grain is moved in the chambers.

It is still a further object of the invention to provide a pawl and ratchet drive for the rotor that intermittently drives the rotor in a stop-and-go movement. It is further provided in combination with the drive a spring means that snaps the rotor to its various intermittent positions so that the puffed grain will be instantaneously moved into a discharge position.

Other objects and advantages of the invention will become apparent to those skilled in the art as the nature of the invention is better understood from the following description and as shown in the accompanying drawings.

Figure 1:
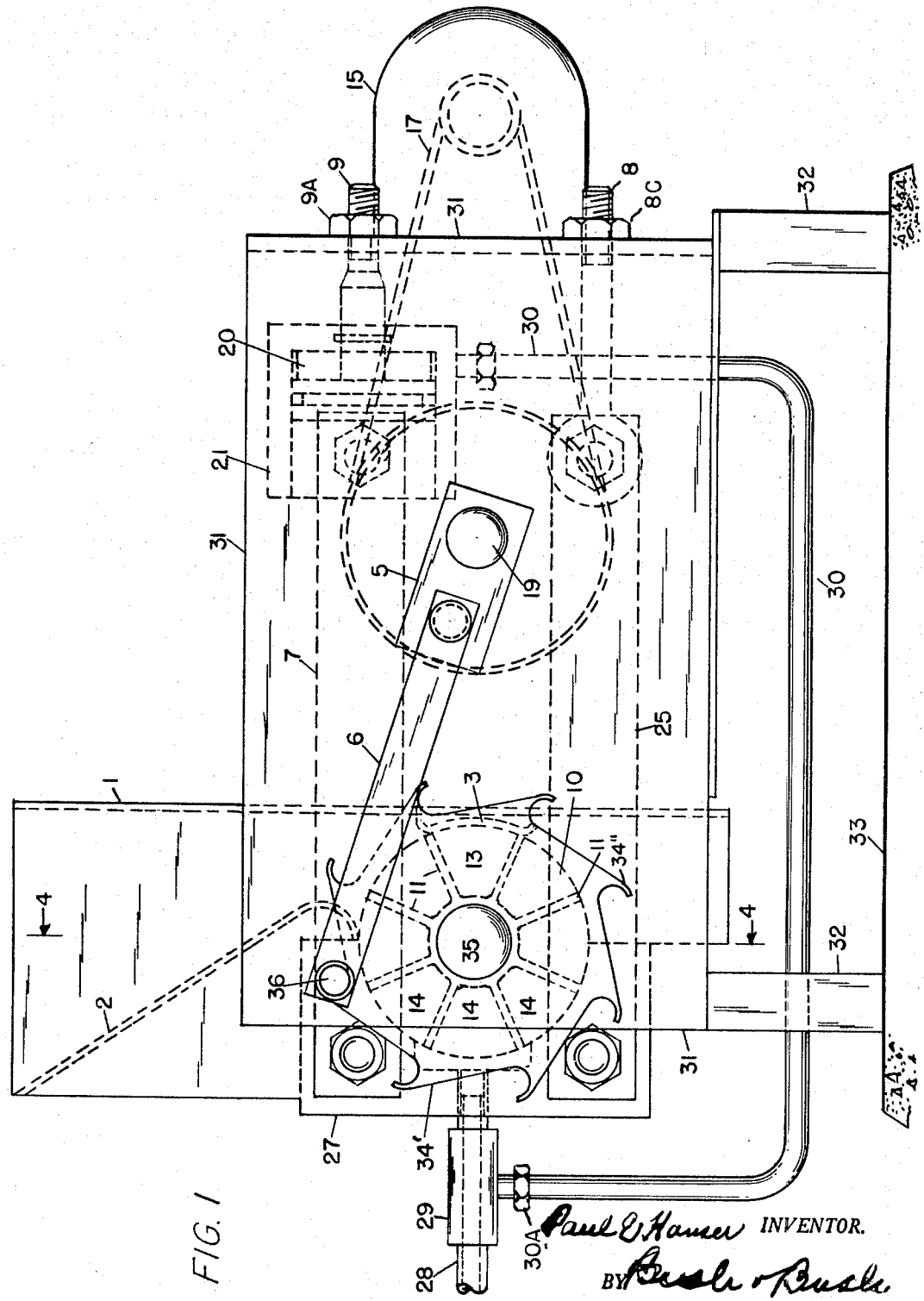

FIGURE 1 is a side elevation of my machine on a foundation which may be of any suitable material, but preferably of concrete.

Figure 2:
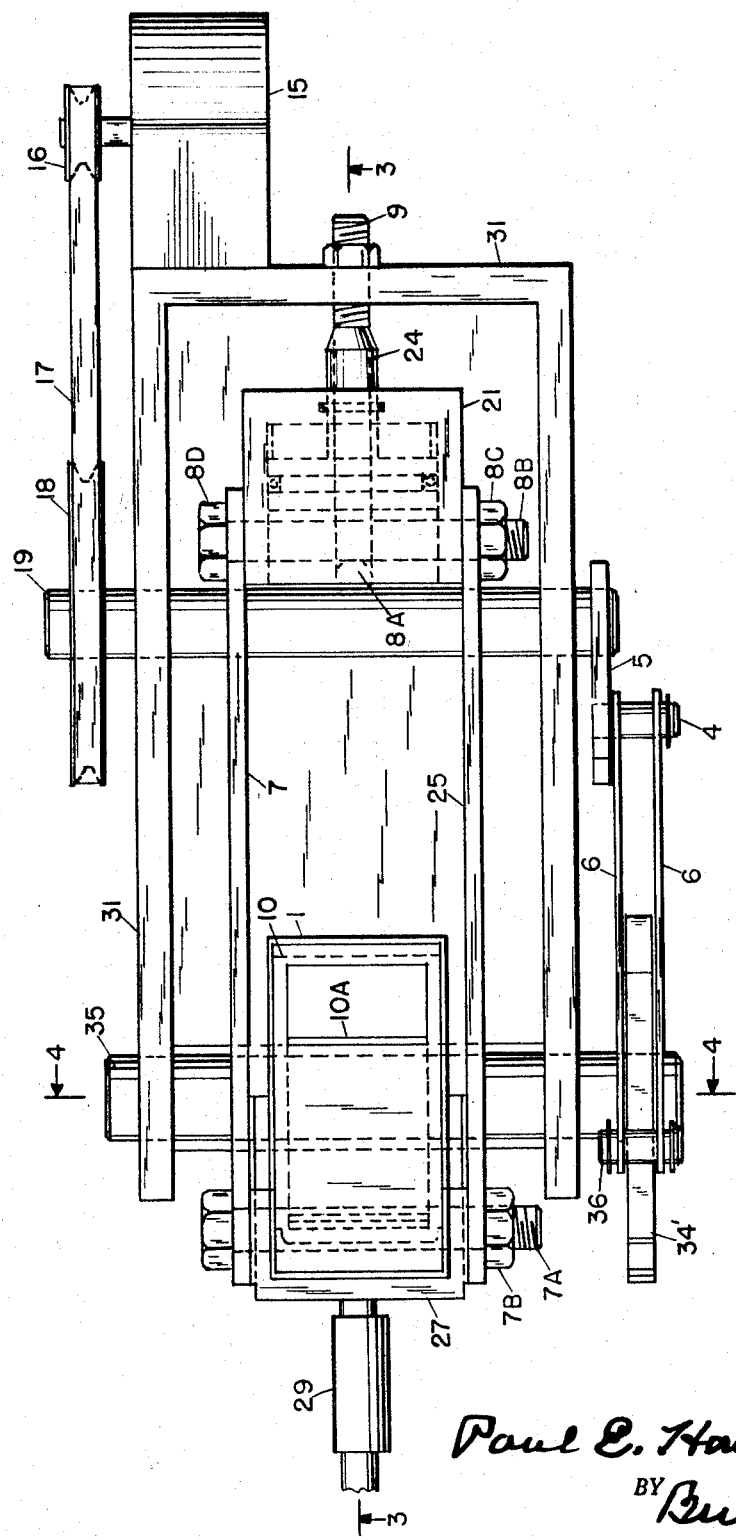
Figure 3:
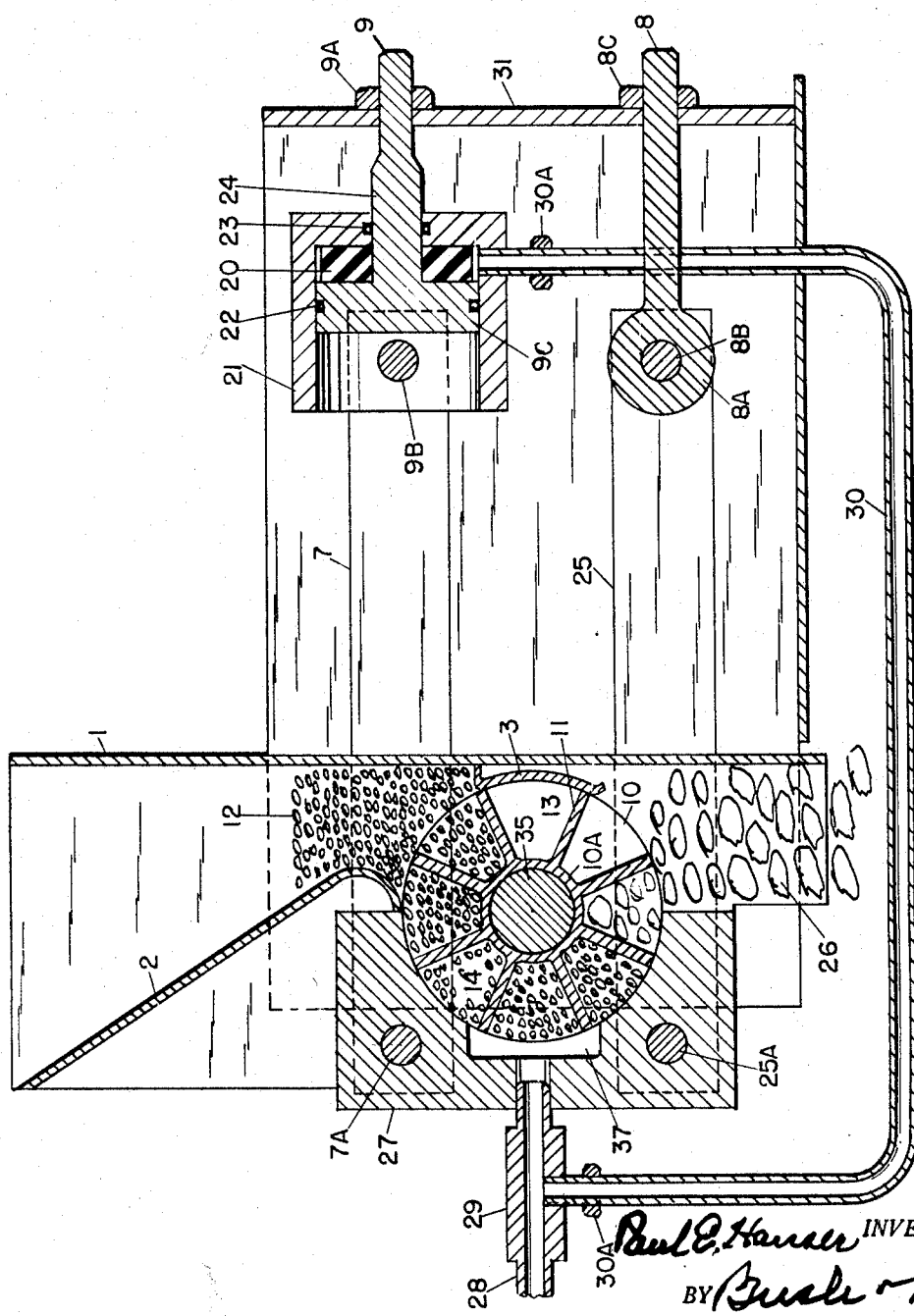
Figure 4:
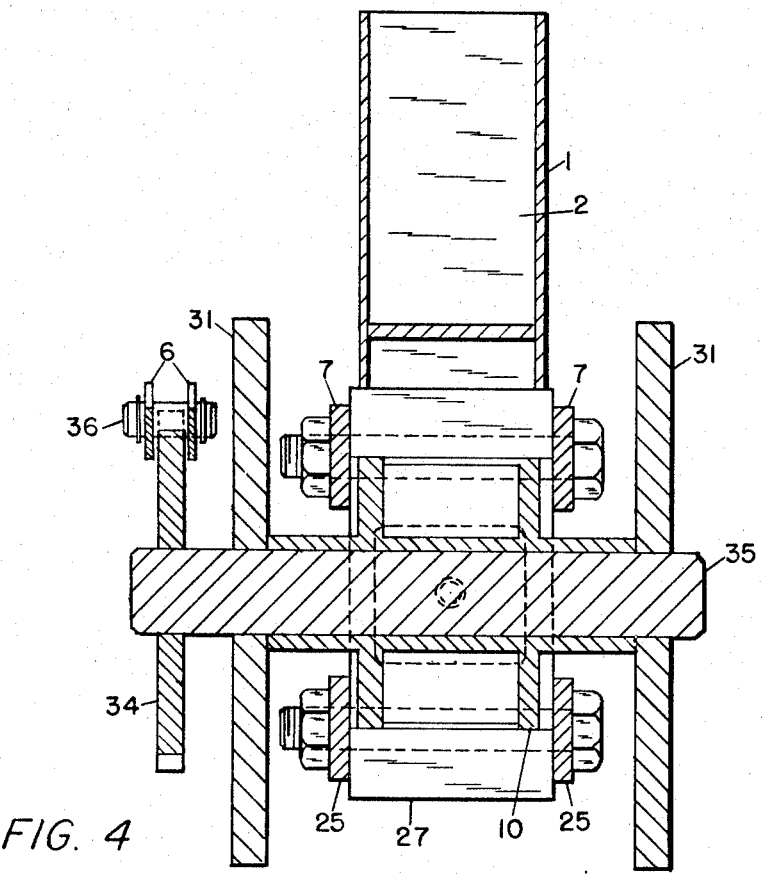

FIGURE 2 is a top or plan view.
FIGURE 3 is a sectional elevation on the line 3—3 of FIGURE 2.
FIGURE 4 is a cross-section on the line of 4—4 of FIGURE 1.
FIGURE 5 is a view similar to FIGURE 1 but showing an improved form of the invention.
FIGURE 6 is a plan view, similar to FIGURE 2, showing the structure of FIGURE 5.
FIGURE 7 is a sectional view taken substantially along the line 7—7 of FIGURE 5.
FIGURE 8 is a sectional view taken substantially along thhe line 8—8 of FIGURE 6.

Referring now to FIGURES 1–4, my invention includes a metal frame or housing 31 preferably of rustproof steel with legs 32 supporting it upon a base or foundation 33.

Upon the frame 31 is mounted upon suitable bearings, a main shaft 35 with a rotor 10 rigidly secured thereon having a tubular hub 10A with a plurality of faces and chambers 14, preferably eight, formed about the hub by vanes 11 extending radially to contact curved faces of a supporting block 27 of suitable metal such as an alloy of brass and iron and aluminum at the rear one-half of the rotor 10. The block 27 has a shallow port chamber 37 cut out to feed live steam to the chambers 14 as they pass and supply them with live steam at a temperature above 212° F. and preferably at a pressure of 200 to 800 pounds per square inch from the feed steam line 28 which may be provided by a boiler and any sufficient source of supply.

One object is to provide means to provide variable degrees of temperature, pressure and time of exposure so as to produce different desired degrees of expansion and size, contour and density of the finished puffed cereal, in order for use as human food, and also to allow the production of larger sized units more suitable for feeding cattle, hogs and other stock which it is desired to fatten for market.

The vanes 11 of the pressure chambers are united at both ends to the side plates 13 of the rotor 10 by welding or other airtight unions capable of preventing leakage of steam or hot air under high pressure and heat.

Opposite the intake port chamber 37, a cover plate 3 of sufficient size to cover the open outer end of any one of the pressure chambers 14 and curved to correspond and fit closely to the outer edges of the vanes 11 and side plates 13 of the rotor 10, is rigidly mounted.

Likewise, the inner sectional faces of the pressure block 27 at both above and below the port chamber 37 will be curved and closely fitted to the outer edges of the vanes 11 and the peripheries of the side plates 13 of the rotor 10 to prevent leakage of steam or vapor at their junctions.

In order to control the intermittent timing of rotation of the rotor and exposure of the cereal to the hot steam and vapor, I mount upon one end of the rotor shaft 35 a modified form of ratchet wheel 34 with a flat circular body and with a plurality of segments of its periphery having plane surfaces 34' with a hook-shaped cog or ratchet 34'' at one end projecting outwardly.

Link bars 6, 6 are mounted at both sides of the wheel 34 with a pivot bar 36 at one end of the link bars arranged to travel along the plane surfaces of the segments to engage the ratchet hooks 34'' and rotate the wheel 34 intermittently.

The other ends of the link bars are pivoted upon a crank or arm 5 by a pivot 4. The crank or arm 5 is driven by a drive shaft 19 actuated by a drive wheel 18. The drive wheel 18 preferably has a V-groove in its periphery for a V-belt 17 which is driven by a motor wheel 16 on a motor shaft which may be driven by any desired form of motor.

The speed of the drive wheel 18 and the crank 5 may be controlled by the speed of the motor 15 and the relative sizes of the wheel 18 and the motor wheel 16 to govern the rotation of the rotor 10.

A set of interchangeable drive and motor wheels of selected sizes may be provided with each complete machine to adapt it to various cereals and sizes as desired.

The rotor 10 with its pressure chambers 14 is rotated intermittently by the ratchet wheel 34 through the hub 10A. The ratchet wheel 34 is rotated intermittently by the links 6, 6 which are driven reciprocatingly by the crank 5 on the end of the shaft 19. The shaft 19 is preferably turned approximately 6 r.p.m. by a motor 15, but its timing may be varied to meet the requirements of different cereals.

The intermittent rotation of the rotor causes a discharging pocket to open rapidly allowing the rapid expansion and pressure drop of the steam in that pocket.

The pressure block 27 is held pressed against the rotor 10 by the links 7 and 25.

The links 25 are anchored to the frame 31 by the eye bolts 8. The links 7 are attached to a pressure balancing cylinder 21 (FIG. 3) which is anchored to the frame 31. The pressure balancing cylinder 21 is composed of the following parts: a piston 9C, a piston "O ring" seal 22, a barrel shaft seal 23, and an elastic rubber spring pad 20 with an annular opening around it to admit the steam.

The pressure balancing cylinder 21 is subjected to pressure of the steam. The steam pressure supply pipe 30 for the pressure balancing cylinder 21, comes from the main steam supply pipe 28 which provides steam to the pressure block 27.

Thus the pressure in the pressure block chamber 37 is the same as the pressure in the cylinder 21, so the force exerted by the pressure balancing cylinder 21 is proportional to the pressure of the steam.

By properly selecting the areas of the pressure balancing cylinder 21, the force exerted by the steam tending to separate the pressure block from the rotor pressure wheel 10, can be balanced. The pressure in the balancing cylinder will increase and decrease to maintain the proper pressure between the pressure block 27 and the pressure wheel 10 while the parts of the machine expand and contract due to temperature changes.

Because the pressure balancing cylinder balances the forces between the pressure wheel and the pressure block, wear will be minimized and the mechanical efficiency will be augmented. The pressure balancing cylinder will automatically compensate for wear between the pressure rotor 10 and the pressure block 27.

A rubber pad 20 which acts as a spring is placed in the pressure balancing cylinder 21 to provide initial tension until the steam pressure builds up.

Each assembly includes the cup-shaped cylinder having the elastic rubber pad 20 at the closed end thereof with an annular open space around it through which live steam may pass from the pipe 30 to a piston head 9C. The piston head is held stationary by the nut 9A and the steam will tend to push the cylinder cup away from the piston head, thereby exerting a pull upon the links 7 and 25 and upon the pressure block 27 to which they are attached.

Referring now to FIGURES 5–8, a different form of the invention includes a horizontal extension 42 on the frame 31 that has an outwardly projecting flange 43. A slightly longer pivot bar or pin 36' is provided to engage the ratchets 34" and is connected to a spring 45 by a pair of links 40, a pivot pin 41 being provided for connection to the spring. The spring 45 is connected at its opposite end to the flange 43. The pivot pin 36' is connected by links 6, 6 to a pin 4 carried on an arm 5, in the manner previously set forth. A tubular shaft 19' extends transversely across the unit and is carried freely rotatable within a tubular drive shaft 48. The arm 5 is fixed to the shaft 19' and the shaft 48 is driven by a V-belt drive 16, 17, 18. Fixed on the shaft 48 is an arm 46 carrying an outwardly projecting pin 47 that contacts the underside of the arm 5.

In operation, the shaft 48 will move in a clockwise direction, as viewed in FIGURE 5, and the lug 46 will contact the arm 5 to drive it upwardly and over and beyond the shafts 19', 48 until the pivot pin 36 engages the next ratchet tooth 34". As the arm 5 is driven to an over-center position, which would be diametrically opposite to its position shown in FIGURE 5, the force of the spring 45 will cause the arm 5 to snap around and out of engagement with the lug 47, and the ratchet and rotor 10 will be moved quickly one complete increment of its rotation.

This feature is important, for it has been found that the steam pressure within the chambers 14 must be instantaneously released for the best results in puffing grain.

It has also been determined that best results of puffing grain occur when a measured amount of grain is moved into the treating chambers 14. To accomplish this, there is provided in the form of the invention shown in FIGURES 5–8 an upright hopper 55 having a lower arcuate shaped bottom 56 that conforms to the shape of and sits over a portion of the rotor 10. A rectangular shaped plunger chamber 54 is positioned beneath the hopper. The hopper has a base opening 57 through which material may be received into the chamber 54. The chamber 54 opens horizontally at 58 into a treating chamber 14 in the rotor 10. A plunger block 53 is horizontally reciprocal in the chamber 54. Mounted on the drive shaft 48 is an eccentric 50 that has a sleeve 51 rotatably carried thereon. Links 52 connect the sleeve 51 to the plunger 53.

As is clearly apparent in FIGURE 8, as the shaft 48 rotates it will cause the eccentric to rotate so as to drive the sleeve 51, links 52 and plunger 53 horizontally. As the plunger 53 is shifted from under the opening 57, grain will fill the plunger housing 54. It should be noted that since the rotor 10 and plunger 53 are controlled by the single drive shaft 48 there is a timing between shifting of the rotor 10 in accordance with each stroke of the plunger. Consequently, each chamber 14 is filled with a predetermined quantity of grain which is the capacity of the plunger chamber 54.

Various modifications may be made in parts of my apparatus without departing from the spirit of my invention as shown in the claims, and I do not limit my claims to the precise forms, pressures, materials or temperatures described.

I claim:

1. The combination of apparatus which comprises means for feeding cereal grain at successive interrupted intervals from an upper hopper into the circumferential open ends of a plurality of radial pressure chambers arranged for rotation in a circular rotor below the hopper, a closure member held against rotation and supported alongside the rotor for movement relative thereto and for sealing in airtight containment the cereal grain in said chambers for a part of each rotation of the rotor, means for applying to and mixing with said cereal grain when the chambers are sealed a flow of hot steam at high pressure from a steam source, and an external force transmitting means applied to the closure member to substantially counterbalance the steam pressure on the member from within the sealed chamber.

2. The structure as set forth in claim 1 in which the external force transmitting means is steam operated and is connected to the steam source whereby the counterbalancing force is substantially proportional to the load on the closure member by the steam within the chamber.

3. The structure as set forth in claim 1 further characterized by means effecting rotation of the rotor at successive interrupted intervals whereby the chambers will be held in immobile positions in their sealed relation with the closure member for short intervals.

4. A grain puffing device comprising a main frame; rotatable structure on the frame having a grain chamber with an open side; a chamber closure device for closing the open side of the chamber; a steam entrance in communication with a steam source and associated with and for moving steam into the chamber; means supporting the closure device against rotation on the frame for radial movement toward and away from the chamber; and a force transmitting mechanism connected to the closure device for forcing the device toward and for sealing the open side of the chamber.

5. The structure as set forth in claim 4 further characterized by the force transmitting mechanism being operatively in communication with the steam source whereby proportionate loads are provided on the device by the force transmitting mechanism and the steam within the chamber.

6. The structure as set forth in claim 5 in which the steam entrance is connected to a steam conduit means extending through the closure device for discharging into the chamber; and the force transmitting mechanism is a cylinder and reciprocating member therein that is connected to the closure device for moving it toward the chamber and the cylinder has inlet means connected to the aforesaid steam conduit means.

7. The structure as set forth in claim 4 in which the closure device includes a block bearing against the chamber at its open side; and the steam entrance is in the block and opens into the chamber, and the force transmitting means includes in part a steam operated cylinder and reciprocating member arrangement connected to the block for forcing it into contact with the chamber walls with a force proportionate to the force of the steam pressure within the chamber.

8. The structure as set forth in claim 4 further characterized by there being a plurality of grain chambers supported on the frame for consecutive movement alongside the closure device whereby the respective chambers may be filled with grain through their open sides prior to movement alongside the closure device and emptied of grain through their open sides after movement from alongside the closure device.

9. The structure as set forth in claim 8 in which the movement of the chambers are intermittent in a stop and go action so that the chambers are held for a period of time adjacent the closure device.

10. The structure as set forth in claim 4 further characterized by the chamber being supported on the frame for rotation about an axis and so that the open side thereof opens radially outwardly and the closure device is a block having an arcuate surface adapted to contact and close the open side of chamber.

11. The structure as set forth in claim 10 in which the steam entrance is in the block and the force transmitting mechanism includes a steam operated mechanism operable from the same steam source that feeds steam through the entrance.

12. The structure as set forth in claim 10 further characterized by the chamber being carried on a rotary mechanism rotatable about the axis; structure on the frame defining an upper grain inlet and a lower grain outlet; and means supporting the rotary mechanism on the frame to rotate and successively move the chamber from the grain inlet to the grain outlet for receipt and discharge respectively of the grain.

13. The structure as set forth in claim 12 further characterized by the rotary mechanism having a ratchet wheel fixed thereto; a pawl adapted to engage the ratchet wheel; and drive means on the frame for reciprocating the pawl so as to move the ratchet wheel and rotary mechanism in a stop and go manner.

14. The structure as set forth in claim 13 further characterized by the pawl and ratchet wheel being spring loaded to force instantaneous movement of the grain chamber from adjacent the closure device to the outlet.

15. The structure as set forth in claim 4 further characterized by the chamber being part of a rotary mechanism positioned alongside the closure device and supported to move about an axis so that the chamber passes adjacent the closure device; and a plunger chamber positioned alongside and opening to the rotary mechanism; and a reciprocating plunger within the plunger chamber for shifting material into the chamber in the rotary mechanism as it moves adjacent thereto.

16. A treating device for processing a food-like material comprising a main frame; structure on the frame defining a material inlet and a material outlet; a rotary mechanism having angularly separated outer chambers and supported on the frame to rotate and successively move the chambers from the inlet to the outlet for receipt and discharge respectively of the material; a chamber closure device alongside the rotary mechanism betwixt the inlet and outlet and adapted to close the respective chambers as they move between the inlet and outlet; a high pressure fluid source having an entrance at the closure device for moving fluid under pressure into the respective chambers as they pass adjacent the closure device; a plunger chamber alongside the rotary mechanism with an open end opening into the outer chambers; a plunger reciprocally movable within the plunger chamber for moving material therefrom into the outer chambers; and means for filling the plunger chamber with material.

17. The structure as set forth in claim 16 further characterized by the means filling the plunger chamber being a hopper supported on the frame above the plunger chamber and opening downwardly into the latter chamber whereby the plunger chamber will be filled following each stroke of the plunger.

18. The structure as set forth in claim 16 further characterized by the rotary mechanism being driven in increments in a stop and go movement and whereby the grain chambers are momentarily held beside the closure device and plunger chamber.

19. The structure as set forth in claim 18 further characterized by movement of the plunger within its chamber and toward the rotary mechanism occurs during the time in which the rotary mechanism is stopped in its stop and go movement.

20. In a food processing machine, a frame; structure on the frame defining an inlet and outlet; a rotary device having angularly separated outer chambers and rotatable to successively move the chambers from the inlet to the outlet for receipt and discharge respectively of the food being processed; a chamber closure device supported against rotation alongside the rotary device for closing the respective chambers as they move between the inlet and outlet; means supporting the closure device and rotary device on the frame for relative radial movement toward and away from one another; fluid pressure means opening into and allowing fluid into the chambers and tending to effect separation between the rotary and closure devices; and an external force transmitting means supported on the frame and effective to bias the rotary and closure devices toward one another to counterbalance the tendency toward separation created by the fluid in the chambers.

21. The structure as set forth in claim 20 in which the force transmitting means are reciprocating piston and cylinder members with one of the members being connected to the frame and the other to the relatively movable device whereby expansion and contraction of the piston and cylinder members will affect the biasing force of one device toward the other; and further characterized by fluid pressure means opening into the cylinder whereby the pressure tending to separate the devices from within the chambers is proportional to that tending to move the devices toward one another.

References Cited

UNITED STATES PATENTS

| | | | |
|---|---|---|---|
| 1,442,304 | 1/1923 | Spencer et al. | 99—238 |
| 1,639,909 | 8/1927 | Suzuki | 99—238 |
| 2,124,746 | 7/1938 | Plews | 99—82 |
| 2,414,185 | 1/1947 | Andrews. | |
| 2,490,112 | 12/1949 | Winters. | |
| 2,585,170 | 2/1952 | Prather. | |
| 2,731,904 | 1/1956 | Van Arsdell et al. | 99—238 |
| 3,104,975 | 9/1963 | Bowman | 99—82 X |

WALTER A. SCHEEL, *Primary Examiner.*

JOHN M. NEARY, *Assistant Examiner.*